United States Patent
Wen

(10) Patent No.: US 8,441,626 B2
(45) Date of Patent: May 14, 2013

(54) OPTICAL ANGLE-OF-ARRIVAL MEASUREMENT SYSTEM AND METHOD FOR MULTIPLE LIGHT SOURCES

(75) Inventor: Bing Wen, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 341 days.

(21) Appl. No.: 12/971,357

(22) Filed: Dec. 17, 2010

(65) Prior Publication Data

US 2012/0154794 A1   Jun. 21, 2012

(51) Int. Cl.
*G01J 1/00*   (2006.01)

(52) U.S. Cl.
USPC .......................................... 356/123; 356/338

(58) Field of Classification Search .......... 356/338–341, 356/5.01–5.08, 4.01, 3, 3.01–3.04, 123; 250/208.1–208.2, 206.1–206.3, 200, 206; 342/61–67, 118, 145–147, 175, 104–116, 342/51–56, 133; 367/118, 125
See application file for complete search history.

(56) References Cited

U.S. PATENT DOCUMENTS

| 5,304,791 | A | 4/1994 | Migliaccio | 250/214 VT |
| 7,205,932 | B2 | 4/2007 | Fiore | 342/133 |
| 7,397,019 | B1 | 7/2008 | Byars et al. | 250/206.1 |
| 7,738,319 | B2 | 6/2010 | Novick | 367/125 |

*Primary Examiner* — Tri T Ton

(74) *Attorney, Agent, or Firm* — Koppel, Patrick, Heybl & Philpott

(57) ABSTRACT

An OAOA measurement system uses optical elements to converge incoming light from multiple sources onto an FPA as respective crosshair patterns made from lines which are oblique with respect to the FPA's axes, such that each pattern's location indicates the angular position of its corresponding source. The optical elements are arranged such that each crosshair's center point is at least twice as bright as the lines which form the crosshair's arms. The position of each crosshair is interpolated by defining regions around each arm of one of the crosshairs, determining the points of peak intensity in each row or column within each region, and curve-fitting the points to define each arm. Multiple crosshair patterns are accommodated by assigning a small magnitude value to each pixel of a defined arm, and then repeating the interpolation process for another crosshair.

22 Claims, 2 Drawing Sheets

OPTICAL ANGLE-OF-ARRIVAL MEASUREMENT SYSTEM AND METHOD FOR MULTIPLE LIGHT SOURCES

BACKGROUND OF THE INVENTION

1. Field of the Invention

This invention relates generally to an optical angle-of-arrival measurement system, and more particularly to an optical angle-of-arrival (OAOA) measurement system and method capable of measuring the OAOA for light arriving from multiple sources simultaneously.

2. Description of the Related Art

High precision and large field-of-view (FOV) optical angle-of-arrival (OAOA) measurement is a critical task in adaptive optics, laser communications, target tracking, optical surveying, and many other applications. Current solutions are limited either by resolution or FOV due to inadequate focal plane array (FPA) size and detector noise. Conventionally, a lens converges incoming light from a fixed location point source onto an FPA that has M (row)×N (column) pixels. The focused spot on the FPA is circular (e.g., having a Gaussian intensity distribution). The position (x, y) of the focused spot on the FPA is determined, from which the optical angle of arrival is calculated as $\theta_x \propto x/f$, $\theta_y \propto y/f$, where f is the focal length of the lens. The resolution ($\delta\theta$) of the OAOA measurement will be proportional to d/f, where d is the FPA pixel width. Improving resolution requires reducing pixel size (d) and/or increasing focal length (f), both of which reduce the FOV.

FOV can be improved with an FPA having a small pixel size and a large number of pixels, but such an FPA is expensive to fabricate. Furthermore, a large number of pixels will slow down the frame rate of the sensor and increase the processing time required to determine the spot location.

One approach to improving the accuracy with which the location of a focused spot on the FPA can be determined is described in co-pending U.S. patent application Ser. No. 12/401,027. Here, optical elements located in front of an FPA convert incoming light into two perpendicular narrow width lines which are oblique with respect to the FPA's row and column axes and which form a crosshair pattern on the FPA. A means for interpolating the position of the lines on the FPA is used to provide x, y coordinates of the point at which the lines intersect, which can be used to calculate the optical angle of arrival in accordance with $\theta x = A(x) \cdot \tan^{-1}(x/f)$, and $\theta y = B(y) \cdot \tan^{-1}(y/f)$, where f is the focal length of the optical element, and A(x) and B(y) are parameters that account for optical distortion and other imperfections of the system.

However, a problem can arise if light originating from multiple sources is simultaneously received and focused on the FPA, which results in multiple crosshair patterns being formed on the FPA. When this happens, it may be difficult or impossible for the interpolation means to determine the correct intersection point for each crosshair pattern, especially when the crosshairs overlap.

SUMMARY OF THE INVENTION

An OAOA measurement system and method are presented which overcome the problems noted above, enabling the locations of multiple center points to be determined when two or more light sources are simultaneously producing multiple crosshair patterns on an FPA.

The present measurement system uses an FPA comprising an M row×N column array of pixels, the rows and columns being parallel to a row axis and a column axis, respectively. One or more optical elements converge incoming light from one or more sources onto the FPA, such that light from each source is converged into a respective pair of perpendicular narrow width lines that form respective crosshair patterns on the FPA. Each of the lines is oblique with respect to the row and column axes and traverses at least two of the rows or columns along its length, such that the position of the lines on the FPA varies with the angular position of each light source relative to the measurement system.

The optical elements are arranged such that the center point of each crosshair pattern is at least twice as bright as the perpendicular narrow width lines which form the arms of the crosshair pattern. The system also includes a means for interpolating the positions on the FPA of each crosshair pattern, comprising:

- selecting a center point on the FPA, the location of which is to be determined;
- defining at least two regions on the FPA around the selected center point, each of which includes at least a portion of a respective one of the arms of the crosshair pattern associated which the selected center point;
- for each of the regions, determining the coordinates of the point of peak intensity in each row or each column within the region; and
- curve-fitting the peak points to define each arm of the crosshair pattern.

The location of the center of each crosshair pattern is determined by calculating the point of intersection of the crosshair pattern's arms as defined via the curve-fitting.

Multiple crosshair patterns may be accommodated by arranging the interpolation means such that, after defining each arm of a given crosshair pattern, a small magnitude value—preferably zero—is assigned to each of the pixels defining those arms. The process outlined above is then repeated for each of the remaining crosshair patterns.

These and other features, aspects, and advantages of the present invention will become better understood with reference to the following description and claims.

DETAILED DESCRIPTION OF THE INVENTION

Figure 1:
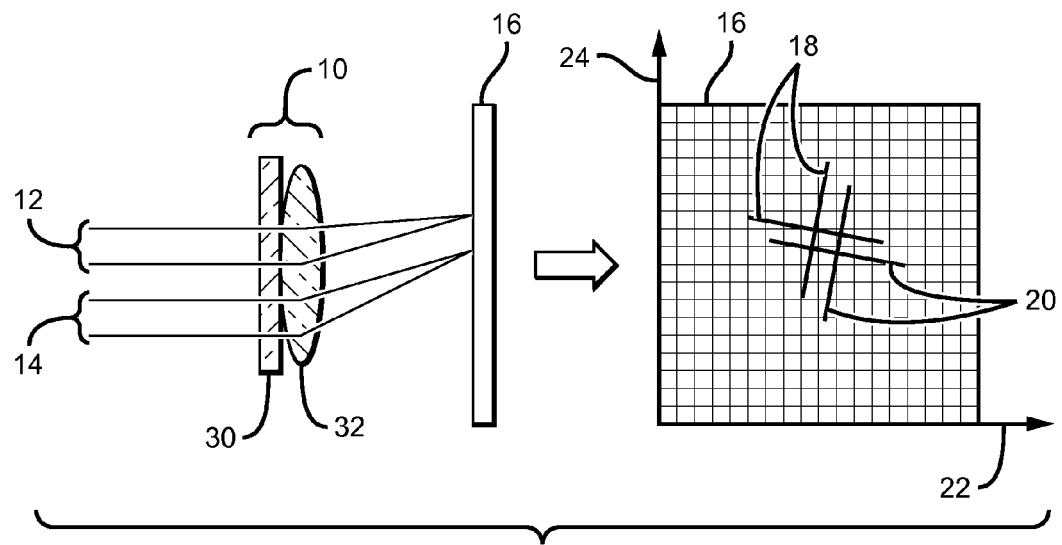
FIG. 1 is a diagram illustrating the basic principles of an optical angle of arrival measurement system.

FIG. 1 illustrates the general principles of an OAOA measurement system, and the problem addressed by the present invention. Such as system is generally useful for determining the OAOA for incoming light produced by a collimated beam, such as a laser beam, or a point light source such as an LED or a star that is at a distance much larger than the distance between the system's optical elements and its focal plane array (FPA).

The system includes one or more optical elements 10, which receive incoming light 12, 14 from respective sources. The optical elements preferably focus light from each source onto an FPA 16 as a pair of perpendicular narrow width lines or 'arms' that form a crosshair pattern on the FPA; in FIG. 1, a crosshair pattern 18 is formed from incoming light 12, and a crosshair pattern 20 is formed from incoming light 14. The system is arranged such that the imaged lines are oblique with respect to the FPA's row and column axes 22, 24, with each line traversing at least two rows or columns (preferably three rows or columns) along its length. The width of the line or lines is preferably approximately equal to the FPA pixel width d.

Optical elements 10 preferably include a diffractive optical element (DOE) 30 and a lens (or a group of lenses) 32. The DOE forms the preferred crosshair patterns and the lens focuses the crosshairs on the FPA as sharp lines. The optical angle of arrival is calculated in accordance with $\theta x = A(x) \cdot \tan^{-1}(x/f)$, and $\theta y = B(y) \cdot \tan^{-1}(y/f)$, where f is the focal length of the optical elements, x and y are the coordinates of the crosshair pattern's center point (i.e., the point at which the perpendicular lines forming the crosshair intersect), and A(x) and B(y) are parameters that account for optical distortion and other imperfections of the system. Additional details regarding a OAOA system of this sort can be found, for example, in co-pending U.S. patent application Ser. No. 12/401,027, assigned to the present assignee.

A means for interpolating the position of the lines on the FPA is used to provide the x, y coordinates. For example, a simple "peak search" algorithm can be used to determine the optical intensity distribution on each line on the FPA, with the x and y coordinates of the brightest pixel providing the data needed to calculate optical angle of arrival. However, a problem can arise if light originating from multiple sources is simultaneously received and focused on the FPA, as this results in multiple crosshair patterns being formed on the FPA. When this happens, it may be difficult or impossible to determine the correct center point for each crosshair pattern, especially when the crosshairs overlap (as shown in FIG. 1).

This problem is overcome with the present OAOA measurement system, which enables the locations of multiple crosshair pattern center points to be determined. As above, the present system includes an FPA comprising an M row×N column array of pixels, the rows and columns of which are parallel to a row axis and a column axis, respectively. One or more optical elements are arranged to converge incoming light from one or more sources onto the FPA, such that light from each of the sources is converged into a respective pair of perpendicular narrow width lines that form respective crosshair patterns on the FPA, with each line being oblique with respect to the row and column axes and traversing at least two of the rows or columns along its length, such that the position of the lines on the FPA varies with the angular position of each light source relative to the measurement system.

Here, however, the optical elements are arranged such that the center point of each crosshair pattern is at least twice as bright as the perpendicular narrow width lines which form the crosshair pattern's arms. Then, the position on the FPA of each crosshair pattern is interpolated with a 'single crosshair-finding algorithm', as follows:

- selecting a center point on the FPA, the location of which is to be determined;
- defining at least two regions on the FPA around the selected center point, each of which includes at least a portion of a respective one of the arms of the crosshair pattern associated which the selected center point;
- for each of the defined regions, determining the coordinates of the point of peak intensity in each row or each column within the region; and
- curve-fitting the peak points to define each arm of the crosshair pattern.

Figure 2:
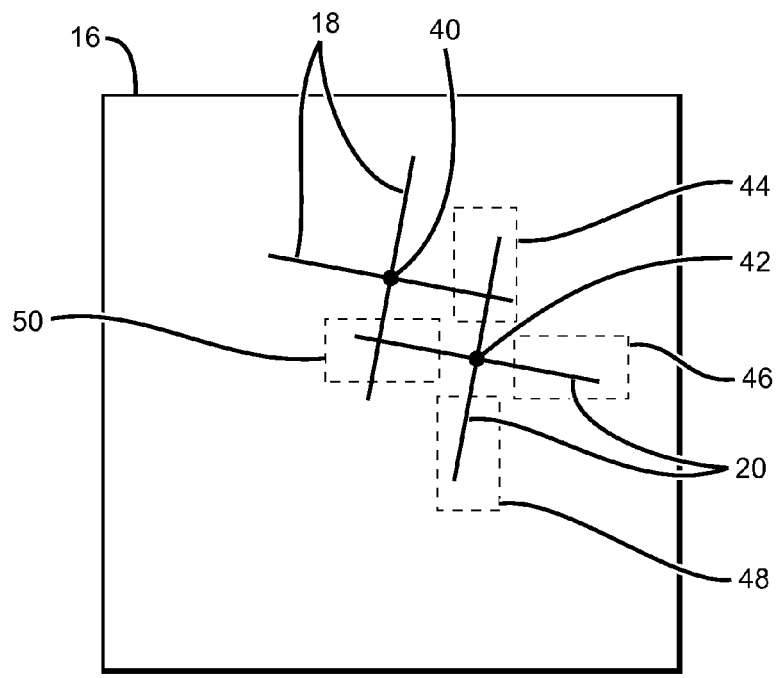
FIG. 2 is a diagram of an FPA on which two crosshair-patterns are focused, illustrating one step in one possible means for interpolating the positions on the FPA of each crosshair pattern.
Figure 3:
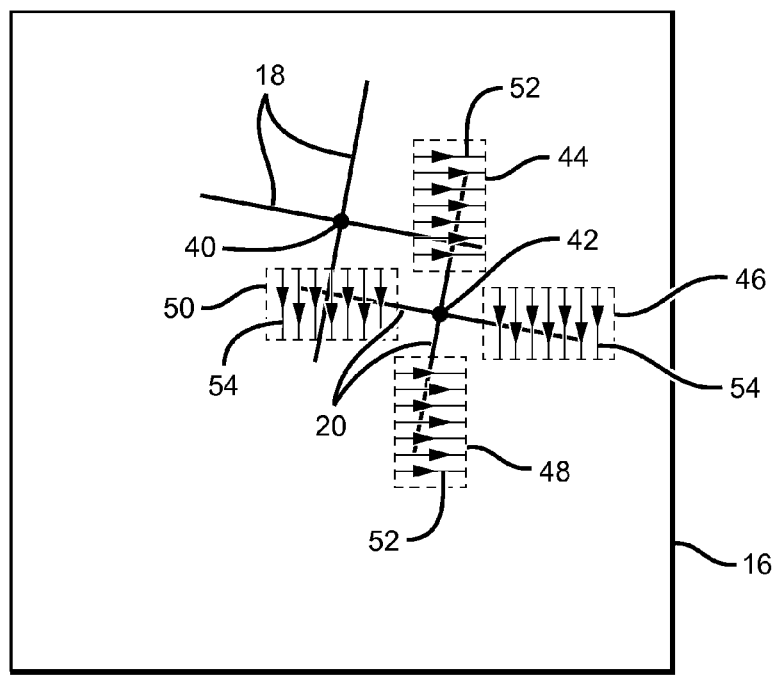
FIG. 3 is a diagram of an FPA on which two crosshair-patterns are focused, illustrating another step in one possible means for interpolating the positions on the FPA of each crosshair pattern.
Figure 4:
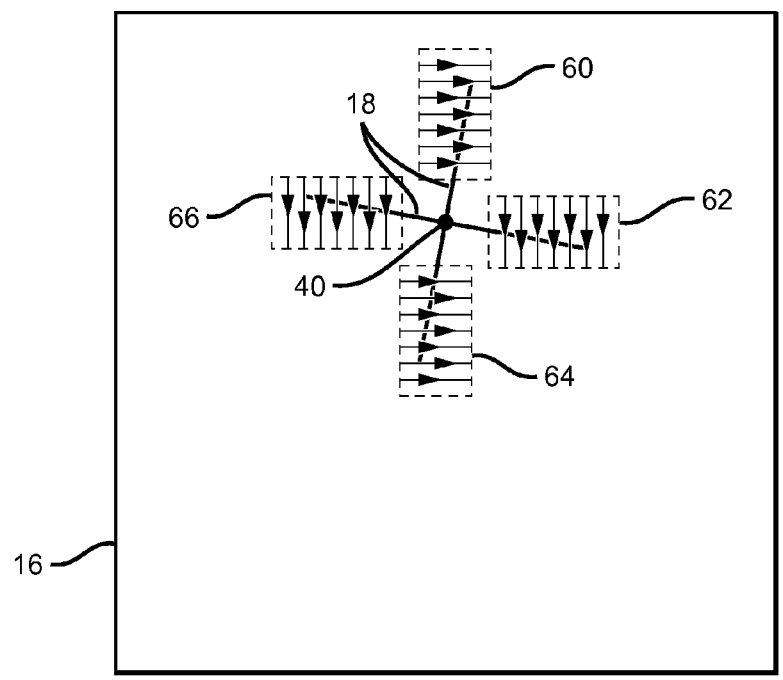
FIG. 4 is a diagram of an FPA on which two crosshair-patterns are focused, illustrating another step in one possible means for interpolating the positions on the FPA of each crosshair pattern.

This process is illustrated FIGS. 2-4. In FIG. 2, multiple crosshair patterns (18, 20) are focused on FPA 16 using optical elements as described above (not shown), which typically include a DOE and one or more lenses. The optical elements are arranged such that the center point 40, 42 of each crosshair pattern is at least twice as bright as the perpendicular narrow width lines which form each crosshair pattern's arms. This can be accomplished by properly designing the DOE.

One of the center points—for example, the brightest center point—is selected to be the first to be analyzed; in this example, center point 20 is selected. At least two regions—preferably four regions—are then defined on the FPA around the center point, with each region containing within its boundaries at least a portion of a respective one of the arms of the crosshair pattern associated which the selected center point. Thus, in FIG. 2, regions 44, 46, 48 and 50 are defined around center point 40, each of which includes a portion of one of the arms of crosshair pattern 20.

The next step requires that the coordinates of the point of peak intensity in each row or each column within each of the defined regions be determined. The preferred means of accomplishing this is illustrated in FIG. 3. For the defined regions (44, 48) located primarily above or below center point 42, each row which intersects the region is scanned (52) across the width of the region—i.e., the output of each pixel within the portion of the row contained within the region is measured. From this data, the point of peak intensity in each row portion can be determined. Similarly, for the defined regions (46, 50) located primarily to the left or right of center point 42, each column which intersects the region is scanned (54) across the height of the region—i.e., the output of each pixel within the portion of the column contained within the region is measured. From this data, the point of peak intensity in each column portion can be determined.

Determining the coordinates of the points of peak intensity can be done in a number of ways. One possible approach is to use the scanning process described above to determine the coordinates of the brightest pixel in each row or each column within each region. Another possible approach to determine the coordinates of the points of peak intensity is to use a peak find algorithm.

The points of peak intensity determined for each row and/or column portion contained within the defined regions are curved-fitted to define the arms of the crosshair pattern. Then, with the arms so defined, the center of the crosshair pattern is established by calculating the point of intersection of the crosshair pattern's arms. When the center point is established as described herein, its location can be known to subpixel accuracy.

Once the center point of a crosshair pattern has been established, that crosshair pattern is effectively eliminated from the FPA. A preferred way of accomplishing this is to 'paint the crosshair black', by assigning a small magnitude value to each of the pixels defining the crosshair pattern's arms; this would typically be done mathematically, using the system's software. The magnitude value assigned to each pixel should be small enough to ensure that the pixels which have been painted black do not affect further processing; assigning a value of zero is preferred. This is illustrated in FIG. 4—with the center point 42 of crosshair pattern 20 established, the pixels defining its arms have been assigned a value of zero, effectively eliminating crosshair 20 from the FPA. With the crosshair pattern eliminated, the center point of another crosshair pattern (if any)—for example, the next brightest center point—can now be selected, and the interpolation process described above repeated. Thus, in FIG. 4, regions 60, 62, 64 and 66 are defined around the arms of crosshair pattern 18, each region is scanned—either row by row (regions 60, 64) or column by column (regions 62, 64)—to determine the points of peak intensity, and the points are curve-fitted to define the arms and thereby precisely establish the location of center point 40.

Note that, though the single crosshair-finding algorithm described above is well-suited for use accommodating situations when two or more light sources are simultaneously producing multiple crosshair patterns on an FPA, it can be also be beneficially used even when there is only one light source and one crosshair pattern (though there would be no need to 'paint the crosshair pattern black' in this instance).

The oblique lines formed by the optical elements may be non-linear; for example, in some cases, the lines may be parabolic by design or due to lens distortion. For these situations, higher order nonlinear terms can be added to the curve-fitting function. Usually, a pair of second-order polynomials, of the form: $x=a_0+a_1 y+a_2 y^2$; $y=b_0+b_1 x+b_2 x^2$, are sufficient. In general, curve-fitting the points of peak intensity is preferably accomplished with a second-order polynomial.

For best results, it is also preferred that the curve-fitting be performed twice, as follows:
  a first curve-fitting is performed over all the points of peak intensity identified in each row portion or each column portion within the defined regions;
  the points which do not lie on the lines defined by the first curve-fitting—i.e., any 'rogue' points—are identified; and
  a second curve-fitting is performed over the points of peak intensity in each row portion or each column portion within the defined regions—with the exception of those points identified as not lying on the lines defined by the first curve-fitting.

Note that, in practice, when a DOE is used as one of the optical elements focusing incoming light onto the FPA, at least some of the perpendicular narrow width lines that form the crosshair patterns will be discontinuous. However, the curve-fitting process should be able to accommodate these discontinuities.

The optical elements 10, such as a DOE and lens, typically operate with incoming light having a predetermined design wavelength, and over a limited range of wavelengths—such as within approximately +/−150 nm—around the design wavelength. Note that the design wavelength can be selected from a wide range: generally, any wavelength from the UV to near IR. To reduce the ambient background noise, an optical bandpass filter—preferably a narrow bandpass, high out-of-band rejection, large FOV optical filter—can be installed in front of the optical elements.

Note that many possible arrangements of optical elements are suitable for use with the present system. For example, the lines forming the crosshair patterns may be generated using two orthogonal uniaxial birefringent cylindrical lens assemblies, in which each birefringent lens assembly consists of a positive cylindrical lens formed from birefringent material and a negative cylindrical lens formed from an isotropic (non-birefringent) material. Preferably, one lens assembly would have a focusing power in the x-direction, for the x-polarization (or y-polarization) component of the light only, and the other lens would have a focusing power in the y-direction, for the y-polarization (or x-polarization) component of the light only. When so arranged, an incoming light beam with random or circular polarization forms a crosshair pattern on the FPA. The pair of birefringent lens assemblies is slightly rotated with respected to the FPA such that the lines forming the crosshair pattern are slightly oblique with respect to the FPA's row and column axes and traverse at least two rows or columns (preferably three rows or columns) along the length of the imaged line. Note that a birefringent cylindrical lens assembly might alternatively be arranged such that the positive cylindrical lens is formed from an isotropic material and the negative cylindrical lens is formed from a birefringent material.

There are many potential applications for an OAOA measurement system and method as described herein, including, for example, surveying, target tracking, attitude measurement, helmet tracking and lasercom. In general, the present system, which makes high resolution and high accuracy performance achievable with a small FPA array size, is useful wherever high angular resolution is required, and SNR is not constrained by background noise or the power of the incoming light source.

Another possible application for the present OAOA measurement system is as an optical tracking system for a motion capture system as might be used in the film industry. The system described herein could be used not only in 'time modulated active marker' systems, but also in other active or passive systems.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. An optical angle of arrival measurement system, comprising:
  a focal plane array (FPA) comprising an M row×N column array of pixels, said rows and said columns being parallel to a row axis and a column axis, respectively;
  one or more optical elements arranged to converge incoming light from one or more sources onto said FPA, such that light from each of said sources is converged into a respective pair of perpendicular narrow width lines that form respective crosshair patterns on said FPA, each of said lines being oblique with respect to said row and column axes and traversing at least two of said rows or columns along its length, such that the position of said lines on said FPA varies with the angular position of each light source relative to said measurement system,
  said optical elements arranged such that the center point of each crosshair pattern is at least twice as bright as the perpendicular narrow width lines which form the arms of said crosshair pattern; and
  a means for interpolating the positions on the FPA of each crosshair pattern, comprising:
    selecting a center point on said FPA, the location of which is to be determined;
    defining at least two regions on said FPA around said center point, each of which includes at least a portion of a respective one of the arms of the crosshair pattern associated which said selected center point;
    for each of said regions, determining the coordinates of the point of peak intensity in each row or each column within said region; and
    curve-fitting said peak points to define each arm of the crosshair pattern.

2. The system of claim 1, wherein said determining the coordinates of the points of peak intensity comprises determining the coordinates of the brightest pixel in each row or each column within said region.

3. The system of claim 1, wherein said determining the coordinates of the points of peak intensity comprises using a peak find algorithm.

4. The system of claim 1, further comprising determining the location of the center of the crosshair pattern by calculating the point of intersection of the crosshair pattern's arms as defined via said curve-fitting.

5. The system of claim 1, wherein said defining at least two regions consists of:
  defining a first region on said FPA above said center point;
  defining a second region on said FPA below said center point;
  defining a third region on said FPA to the left of said center point; and
  defining a fourth region on said FPA to the right of said center point;
  wherein said determining the coordinates of the points of peak intensity in each row or each column within said region consists of determining the coordinates of the points of peak intensity in each row within said region for said first and second regions and determining the coordinates of the points of peak intensity in each column within said region for said third and fourth regions.

6. The system of claim 1, wherein said means for interpolating the positions on the FPA of each crosshair pattern further comprises:
  after defining each arm of the crosshair pattern, assigning a magnitude value to each of the pixels defining said arms which is small enough to ensure that said pixels do not affect further processing.

7. The system of claim 6, further comprising repeating said interpolation steps and said step of assigning a small magnitude value to the pixels of any arms so defined for each of the remaining center points on said FPA.

8. The system of claim 6, wherein the magnitude value assigned to each of the pixels defining said arms is zero.

9. The system of claim 1, wherein said optical elements comprise a diffractive optical element (DOE).

10. The system of claim 9, wherein said optical elements further comprise one or more lenses between said DOE and said FPA.

11. The system of claim 1, wherein said curve-fitting is performed using a second-order polynomial.

12. The system of claim 1, wherein curve-fitting said points comprises:
  performing a first curve-fitting over all the points of peak intensity identified in each row or each column within the defined regions;
  identifying the points which do not lie on the lines defined by said first curve-fitting; and
  performing a second curve-fitting over the points of peak intensity in each row or each column within the defined regions with the exception of those points identified as not lying on the lines defined by said first curve-fitting.

13. The system of claim 1, wherein at least some of said perpendicular narrow width lines that form said crosshair patterns are discontinuous.

14. The system of claim 1, wherein said step of determining the coordinates of the point of peak intensity in each row or each column within each of said regions comprises:
  for a region located primarily above or below said center point, scanning across the width of said region along each row that intersects said region; and
  for a region located primarily to the left or right of said center point, scanning across the height of said region along each column that intersects said region.

15. An optical angle of arrival measurement system for determining the angles of arrival of multiple light, comprising:
  a focal plane array (FPA) comprising an M row×N column array of pixels, said rows and said columns being parallel to a row axis and a column axis, respectively;
  one or more optical elements arranged to converge incoming light from one or more sources onto said FPA, such that light from each of said sources is converged into a respective pair of perpendicular narrow width lines that form respective crosshair patterns on said FPA, each of said lines being oblique with respect to said row and column axes and traversing at least two of said rows or columns along their respective lengths, such that the position of said lines on said FPA varies with the angular position of each source relative to said measurement system;
  said optical elements arranged such that the center point of each crosshair pattern is at least twice as bright as the perpendicular narrow width lines which form the arms of said crosshair pattern; and
  a means for interpolating the positions on the FPA of each crosshair pattern, comprising:
    selecting a center point, the location of which is to be determined;
    defining a first region on said FPA above said center point;
    defining a second region on said FPA below said center point;
    defining a third region on said FPA to the left of said center point; and
    defining a fourth region on said FPA to the right of said center point;
    determining the coordinates of the brightest pixel in each row within said region for said first and second regions; and
    determining the coordinates of the brightest pixel in each column within said region for said third and fourth regions;
    for each of said regions, curve-fitting the points representing said brightest pixels to define each arm of the crosshair pattern;
    calculating the point of intersection of the crosshair pattern's arms as defined via said curve-fitting; and
    assigning a magnitude value of zero to each of the pixels defining said arms; and
  repeating said interpolation procedure until the positions of each of the remaining crosshair patterns on said FPA have been determined.

16. The system of claim 15, wherein said step of determining the coordinates of the brightest pixel in each row within said region for said first and second regions comprises:
  scanning across the width of each of said first and second regions along each row that intersects that region; and
  wherein said step of determining the coordinates of the brightest pixel in each column within said region for said third and fourth regions comprises:
  scanning across the height of each of said third and fourth regions along each column that intersects that region.

17. A method of determining the optical angle of arrival of multiple light sources, comprising:

providing a focal plane array (FPA) comprising an M row×N column array of pixels, said rows and said columns being parallel to a row axis and a column axis, respectively;

converging light from one or more sources onto a focal plane array (FPA) comprising an M row×N column array of pixels such that light from each of said sources is converged into a respective pair of perpendicular narrow width lines that form respective crosshair patterns on said FPA, each of said lines being oblique with respect to said row and column axes and traversing at least two of said rows or columns along their respective lengths, such that the position of said lines on said FPA varies with the angular position of each source relative to said FPA, said light converged such that the center point of each crosshair pattern is at least twice as bright as the perpendicular narrow width lines which form the arms of said crosshair pattern;

selecting a center point, the location of which is to be determined;

defining at least two regions on said FPA around said center point, each of which includes at least a portion of a respective one of the arms of the crosshair pattern associated which said selected center point;

for each of said regions, determining the coordinates of the point of peak intensity in each row or each column within said region; and curve-fitting said peak points to define each arm of the crosshair pattern.

18. The method of claim 17, further comprising:
after defining each arm of the crosshair pattern, calculating the point of intersection of the crosshair pattern's arms as defined via said curve-fitting.

19. The method of claim 17, further comprising:
after defining each arm of the crosshair pattern, assigning a magnitude value to each of the pixels defining said arms which is small enough to ensure that said pixels do not affect further processing.

20. The method of claim 19, further comprising repeating said interpolation steps and said step of assigning a small magnitude value to the pixels of any arms so defined for each of the remaining center points on said FPA.

21. The method of claim 19, wherein the magnitude value assigned to each of the pixels defining said arms is zero.

22. The method of claim 17, wherein said step of determining the coordinates of the point of peak intensity in each row or each column within each of said regions comprises:
for a region located primarily above or below said center point, scanning across the width of said region along each row that intersects said region; and
for a region located primarily to the left or right of said center point, scanning across the height of said region along each column that intersects said region.

* * * * *